(12) United States Patent
Perlman

(10) Patent No.: US 7,339,900 B2
(45) Date of Patent: Mar. 4, 2008

(54) METHOD AND APPARATUS FOR PREVENTING SPANNING TREE LOOPS DURING TRAFFIC OVERLOAD CONDITIONS

(75) Inventor: Radia J. Perlman, Acton, MA (US)

(73) Assignee: Sun Microsystem, Inc., Santa Clara, CA (US)

( * ) Notice: Subject to any disclaimer, the term of this patent is extended or adjusted under 35 U.S.C. 154(b) by 875 days.

(21) Appl. No.: 10/671,643

(22) Filed: Sep. 26, 2003

(65) Prior Publication Data

US 2005/0068903 A1    Mar. 31, 2005

(51) Int. Cl.
*H04L 12/28* (2006.01)

(52) U.S. Cl. ..................................... 370/256

(58) Field of Classification Search ................ 370/256, 370/255, 254

See application file for complete search history.

(56) References Cited

U.S. PATENT DOCUMENTS

| | | | | |
|---|---|---|---|---|
| 5,309,437 A * | 5/1994 | Perlman et al. | ............. | 370/401 |
| 5,606,669 A * | 2/1997 | Bertin et al. | ................ | 709/223 |
| 5,761,435 A * | 6/1998 | Fukuda et al. | ............. | 709/238 |
| 6,061,362 A * | 5/2000 | Muller et al. | ............... | 370/463 |
| 6,081,512 A * | 6/2000 | Muller et al. | ............... | 370/256 |
| 6,081,522 A * | 6/2000 | Hendel et al. | ............. | 370/389 |
| 6,094,435 A * | 7/2000 | Hoffman et al. | ........... | 370/414 |
| 6,119,196 A * | 9/2000 | Muller et al. | ............... | 710/243 |
| 6,219,739 B1 * | 4/2001 | Dutt et al. | ................... | 710/311 |
| 6,246,680 B1 * | 6/2001 | Muller et al. | ............... | 370/389 |
| 6,262,977 B1 * | 7/2001 | Seaman et al. | ............. | 370/256 |
| 6,298,456 B1 * | 10/2001 | O'Neil et al. | ................. | 714/48 |
| 6,330,229 B1 * | 12/2001 | Jain et al. | .................... | 370/256 |
| 6,388,995 B1 * | 5/2002 | Gai et al. | .................... | 370/256 |
| 6,535,490 B1 * | 3/2003 | Jain | ........................... | 370/256 |
| 6,611,502 B1 * | 8/2003 | Seaman | ...................... | 370/256 |
| 6,628,624 B1 * | 9/2003 | Mahajan et al. | ............ | 370/256 |
| 6,697,339 B1 | 2/2004 | Jain | ........................... | 370/256 |
| 6,771,610 B1 * | 8/2004 | Seaman | ...................... | 370/256 |
| 6,816,467 B1 * | 11/2004 | Muller et al. | ............... | 370/256 |
| 6,937,576 B1 * | 8/2005 | Di Benedetto et al. | ..... | 370/256 |
| 6,992,988 B2 * | 1/2006 | Reynders et al. | ........... | 370/255 |
| 2002/0154606 A1 * | 10/2002 | Duncan et al. | ............. | 370/256 |
| 2002/0159398 A1 * | 10/2002 | Yamada et al. | ............. | 370/256 |
| 2003/0165119 A1 * | 9/2003 | Hsu et al. | ................... | 370/258 |

OTHER PUBLICATIONS

"Part 3: Media Access Control (MAC) Bridges," ANSI/IEEE Standard 802.ID 1998.*

* cited by examiner

*Primary Examiner*—Hassan Kizou
*Assistant Examiner*—Mounir Moutaouakil
(74) *Attorney, Agent, or Firm*—Park, Vaughan & Fleming LLP

(57) ABSTRACT

One embodiment of the present invention provides a system that prevents loops from occurring when spanning tree configuration messages are lost while executing a spanning tree protocol on bridges in a network. During operation, the system executes the spanning tree protocol on a bridge. This spanning tree protocol configures each port coupled to the bridge into either a forwarding state, in which messages are forwarded to and from the port, or a backup state, in which messages are not forwarded to or from the port. The system also monitors ports coupled to the bridge to determine when messages are lost by the ports. If one or more messages are lost on a port, the system refrains from forwarding messages to or from the port until no messages are lost by the port for an amount of time.

14 Claims, 3 Drawing Sheets

METHOD AND APPARATUS FOR PREVENTING SPANNING TREE LOOPS DURING TRAFFIC OVERLOAD CONDITIONS

BACKGROUND

1. Field of the Invention

The present invention relates to the design of computer networks. More specifically, the present invention relates to a method and an apparatus that prevents loops from occurring when spanning tree configuration messages are lost while executing a spanning tree protocol across bridges in a network.

2. Related Art

Computer networks are frequently coupled together through transparent bridges. The most basic form of transparent bridge is one that attaches to two or more local area networks (LANs) (each attachment to a bridge is referred to as a "port"). Such a bridge listens promiscuously to every packet transmitted and stores each received packet until it can be transmitted on the LANs other than the one on which it was received.

The transparent bridge was developed to allow stations that were designed to operate on only a single LAN to work in a multi-LAN environment. The stations expect to transmit a packet, exactly as they would in a single-LAN environment, and have the packet delivered. The bridge must therefore transmit the packet exactly as received. If the bridge modified the packet in any way—for example, by overwriting the source address portion of the header with its own address—then protocols on stations might not work properly.

Note that bridges can potentially cause a packet to loop, which can cause the packet to replicate exponentially. This replication can increase congestion on the network to the point where the network stops functioning.

This looping problem is commonly dealt with by using a spanning tree protocol defined in Institute of Electrical and Electronics Engineers (IEEE) standard 802.1D. This spanning tree protocol operates by having bridges dynamically discover a subset of the network topology that is loop-free (a tree) and yet has enough connectivity so that, where physically possible, there is a path between every pair of LANs (the tree is spanning).

The basic idea behind the spanning tree protocol is that bridges periodically transmit special configuration messages to each other that allow them to calculate a spanning tree. Referring to FIG. 2, these configuration messages contain enough information to allow bridges to do the following. (1) Elect a single bridge among all bridges on all LANs, to be the root bridge (step 202). (2) Calculate the distance of shortest path from themselves to the root bridge (step 204). (3) Elect a designated bridge on each LAN from the bridges residing on that LAN (step 206), wherein the elected bridge is the one closest to the root bridge and will forward packets to the root bridge. (4) Choose a port for each bridge that gives the best path to the root bridge (step 208). (5) Select ports on each bridge to be included in the spanning tree (step 210). (6) Place selected ports into a forwarding state in which messages are forwarded to and from the port (step 212). (7) Place other ports into a backup state, in which messages are not forwarded to or from the port (step 214).

This protocol can be summarized in the following poem entitled "Algorhyme" by Radia Perlman, the inventor of the present invention.

I think that I shall never see
A graph more lovely than a tree.
A tree whose crucial property
Is loop free connectivity.
A tree that must be sure to span
So packets can reach every LAN.
First, the root must be selected.
By ID, it is elected.
Least-cost paths from root are traced.
In the tree, these paths are placed.
A mesh is made by folks like me,
Then bridges find a spanning tree.

It is important to engineer a bridge with sufficient CPU power so that if the network becomes congested, the spanning tree protocol will operate properly. Otherwise, the network becoming temporarily congested might cause configuration messages to become lost, which can cause the spanning tree protocol to incorrectly turn extra bridge ports on. This can cause loops, which can dramatically increase the amount of congestion to such a point that the spanning tree protocol never recovers.

Unfortunately, the IEEE 802.1D standard does not specify a performance requirement, and as a result, some of the bridge hardware that is presently deployed is not capable of processing spanning tree configuration messages during worst-case traffic. Consequently, messages can be lost and loops can be created.

Hence, what is needed is a method and an apparatus that prevents loops from occurring when spanning tree configuration messages are lost.

SUMMARY

One embodiment of the present invention provides a system that prevents loops from occurring when spanning tree configuration messages are lost while executing a spanning tree protocol on bridges in a network. During operation, the system executes the spanning tree protocol on a bridge. This spanning tree protocol configures each port coupled to the bridge into either a forwarding state, in which messages are forwarded to and from the port, or a backup state, in which messages are not forwarded to or from the port. The system also monitors ports coupled to the bridge to determine when messages are lost by the ports. If one or more messages are lost on a port, the system refrains from forwarding messages to or from the port until no messages are lost by the port for an amount of time.

In a variation on this embodiment, the amount of time is greater than a time interval provided by bridges between consecutive spanning tree configuration messages.

In a variation on this embodiment, monitoring ports coupled to the bridge involves communicating with hardware associated with the ports to determine if messages have been lost by the ports.

In a variation on this embodiment, executing the spanning tree protocol involves placing ports coupled to the bridge into either the forwarding state or the backup state in a manner that ensures that messages are forwarded without cycling across a spanning tree that couples together bridges in the network.

In a variation on this embodiment, executing the spanning tree protocol involves: electing a single bridge among all bridges on all links on the network to be a root bridge; calculating the distance of the shortest path from each node to the root bridge; electing a designated bridge for each link from all bridges on the link, wherein the designated bridge is closest to the root bridge and will forward packets from the link to the root bridge; choosing a root port for each bridge that provides the best path to the root bridge; selecting ports on each bridge to be included in the spanning tree, wherein the selected ports include the root port and any ports coupled to links upon which the bridge serves as the designated bridge; placing selected ports into the forwarding state; and placing all other ports into the backup state.

In a variation on this embodiment, the spanning tree protocol generally operates in accordance with Institute of Electrical and Electronics Engineers (IEEE) standard 802.1D.

In a variation on this embodiment, the links are Local Area Networks (LANs).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The Network

Figure 1:
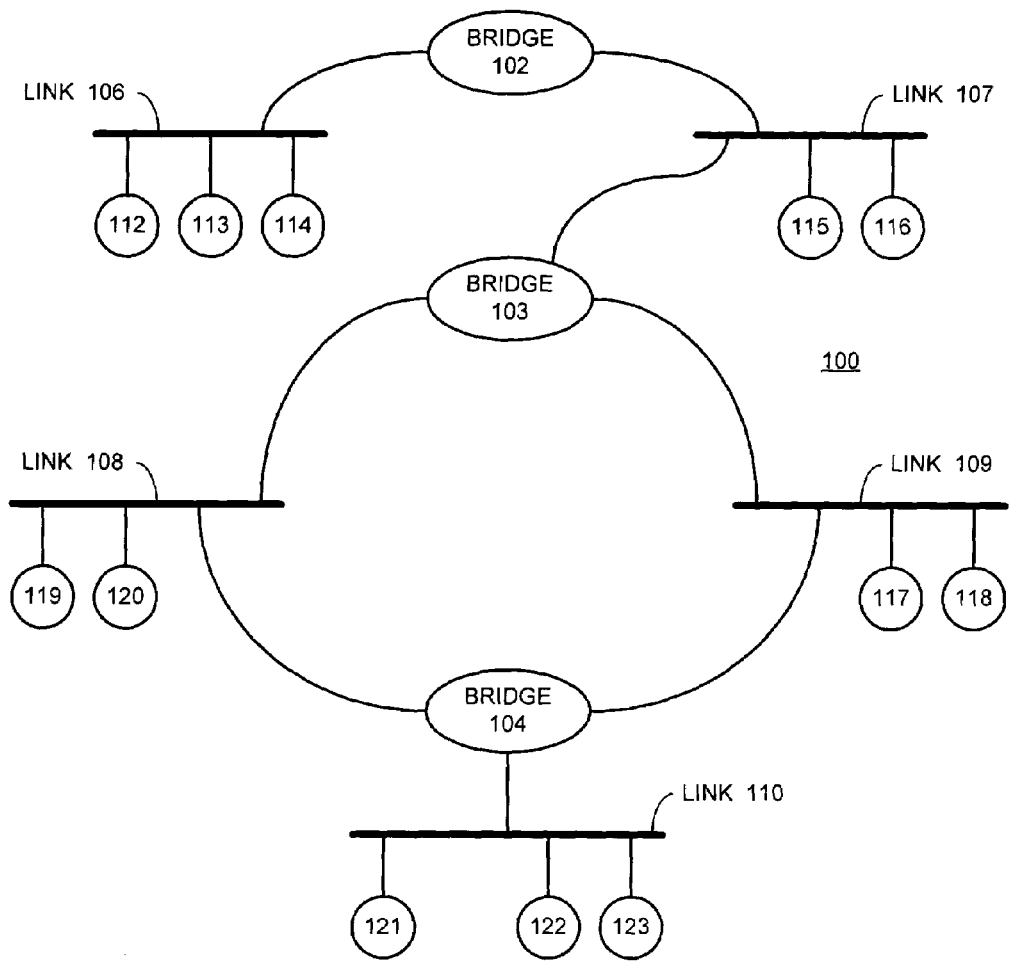
FIG. 1 illustrates an exemplary network with bridges in accordance with an embodiment of the present invention.

FIG. 1 illustrates an exemplary network 100 with bridges in accordance with an embodiment of the present invention. As is illustrated in FIG. 1, network 100 includes a number of links 106-110. In one embodiment of the present invention, links 106-110 are local area networks (LANs), such as Ethernet-based networks, that couple together local computing nodes (stations). More specifically, in FIG. 1, link 106 couples together nodes 112-114 and bridge 102; link 107 couples together nodes 115-116 and bridges 102-103; link 108 couples together nodes 119-120 and bridges 103-104, link 109 couples together nodes 117-118 and bridges 103-104; and link 110 couples together nodes 121-123 and bridge 104.

Note that bridges 102-104 are designed to transparently couple together links 106-110 so that they appear to be part of a single combined network.

Spanning Tree Protocol

Figure 2:
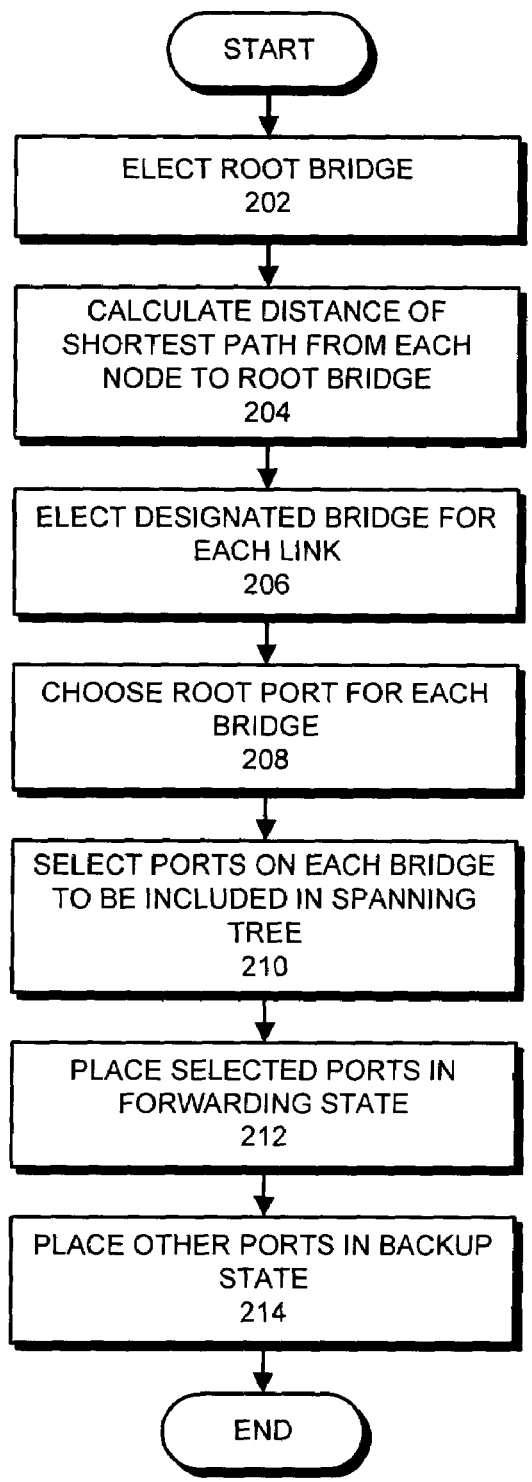
FIG. 2 presents a flow chart illustrating a spanning tree protocol.

The spanning tree protocol generally operates as described above with reference to FIG. 2. However, in some cases network congestion can cause spanning tree configuration messages to be lost, which can cause the spanning tree protocol to incorrectly turn extra bridge ports on. This can possibly cause loops, which can dramatically increase the amount of congestion to a point that the spanning tree protocol never recovers.

Figure 3:
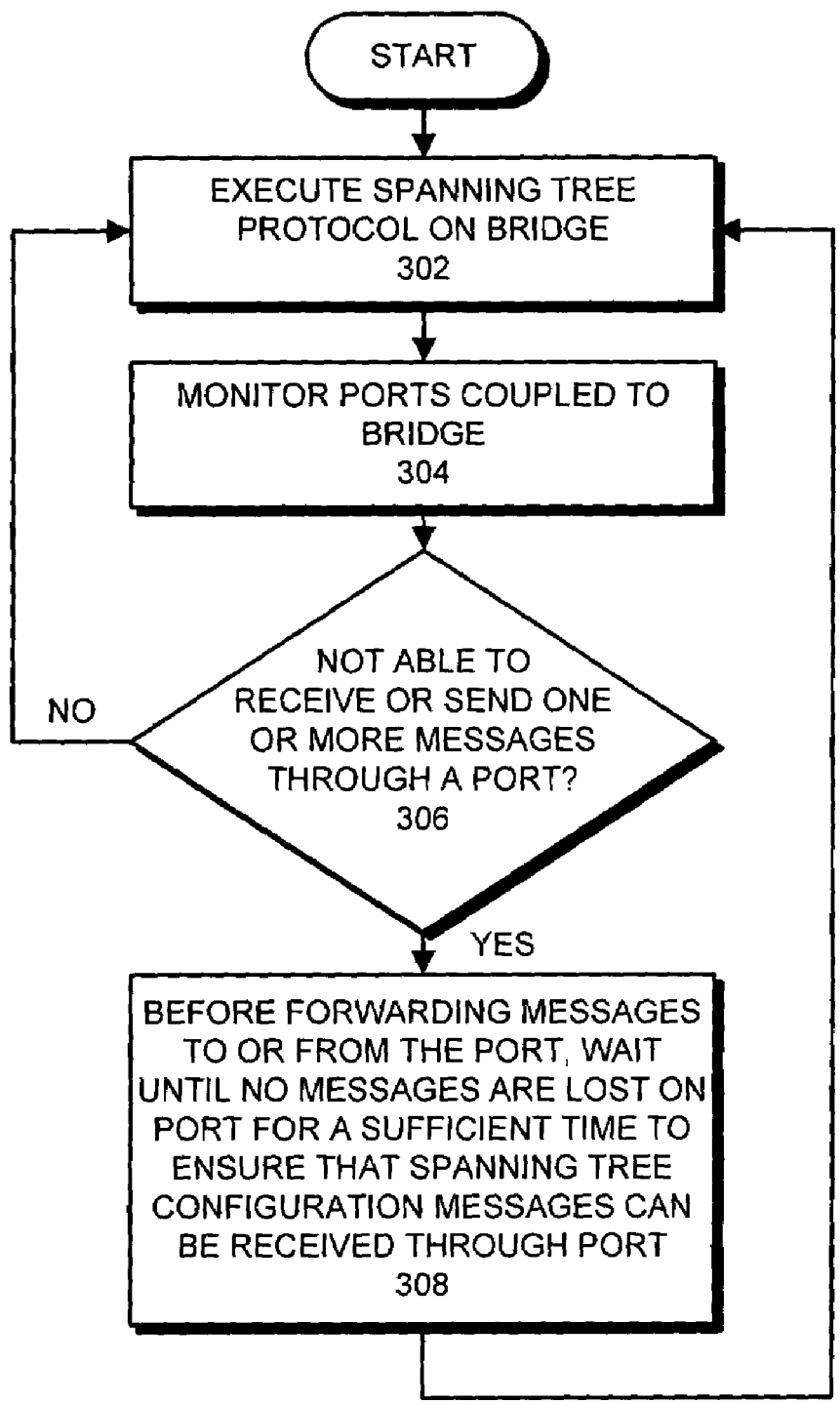
FIG. 3 presents a flow chart illustrating how the spanning tree protocol deals with lost messages in accordance with an embodiment of the present invention.

FIG. 3 presents a flow chart illustrating how the spanning tree protocol deals with lost messages to prevent the occurrence of such loops in accordance with an embodiment of the present invention. The system generally executes a spanning tree protocol as described above with reference to FIG. 2 (step 302). At the same time, the system monitors ports coupled to the bridge (step 304). During this monitoring process, the system determines if messages have been "lost" by any ports. Note that messages are "lost" on a port when the system is not able to send or receive one or more messages through the port (step 306).

It is implementation dependent how a bridge knows that it is not keeping up with traffic. In one embodiment of the present invention, the NIC card informs a driver, which increments counters indicating lost incoming messages (for example, when an incoming message is lost due to a buffer overrun condition). These counters are available for inspection by the upper layers.

Another case in which spanning tree meltdowns occur is when a bridge is not capable of transmitting its spanning tree messages. A typical case in which this occurs is where there is a link which is configured as half duplex in one direction and full in the other. In this case, if the full duplex side has sufficient traffic, the half duplex side will not be able to transmit. (Note that the system may try to send a message one or more times before giving up.) This situation will only be detectable by the half duplex side. If that bridge (the one that believes it is half duplex on that link) believes it should be designated bridge on that link, and it cannot transmit its spanning tree messages, then as in the previous scenario, it should continue doing its best to run the spanning tree algorithm itself, but it should not forward data traffic to and from the link.

If at step 306 the system determines no messages have been lost, the system returns to step 302 to continue executing the spanning tree protocol.

Otherwise, if a message has been lost by a port, before forwarding messages to or from the port, the system waits until no messages are lost by the port for a sufficient amount of time to ensure that subsequent spanning tree configuration messages are received on the port (step 308). This ensures that the port will not erroneously forward messages as the result of spanning tree configuration messages being lost. This reduces the likelihood that loops will be erroneously generated by the spanning tree protocol.

Note that if messages are lost on a port that is in forwarding state, the associated bridge may not know that it should have changed the port to the backup state because another bridge is more qualified to be the designated bridge. On the other hand, if messages are lost on a port that is in backup state, the bridge may assume that it is the designated bridge for the port (or possibly the root bridge) and may erroneously change the port to forwarding state, when there actually exists a more qualified bridge.

The foregoing descriptions of embodiments of the present invention have been presented for purposes of illustration and description only. They are not intended to be exhaustive or to limit the present invention to the forms disclosed.

Accordingly, many modifications and variations will be apparent to practitioners skilled in the art. Additionally, the above disclosure is not intended to limit the present invention. The scope of the present invention is defined by the appended claims.

What is claimed is:

1. A method that prevents loops from occurring when spanning tree configuration messages are lost while executing a spanning tree protocol across bridges in a network, comprising:
   executing the spanning tree protocol on a bridge, wherein the spanning tree protocol configures each port coupled to the bridge into either a forwarding state, in which messages are forwarded to and from the port, or a backup state, in which messages are not forwarded to or from the port;
   monitoring ports coupled to the bridge to determine when messages are lost by the ports due to temporary network conditions; and
   if one or more messages are lost on a port, refraining from forwarding messages to or from the port until no messages are lost by the port for an amount of time;
   wherein refraining from forwarding messages to or from the port until no messages are lost for the amount of time prevents the spanning tree protocol from creating loops due to messages lost during the temporary network conditions.

2. The method of claim 1, wherein the amount of time is greater than a time interval provided by bridges between consecutive spanning tree configuration messages.

3. The method of claim 1, wherein monitoring ports coupled to the bridge involves communicating with hardware associated with the ports to determine if messages have been lost by the ports.

4. The method of claim 1, wherein executing the spanning tree protocol involves placing ports coupled to the bridge into either the forwarding state or the backup state in a manner that ensures that messages are forwarded without cycling across a spanning tree that couples together bridges in the network.

5. The method of claim 1, wherein the spanning tree protocol generally operates in accordance with Institute of Electrical and Electronics Engineers (IEEE) standard 802.1D.

6. The method of claim 1, wherein the links are Local Area Networks (LANs).

7. The method of claim 4, wherein executing the spanning tree protocol involves:
   electing a single bridge among all bridges on all links on the network to be a root bridge;
   calculating the distance of the shortest path from each node to the root bridge;
   electing a designated bridge for each link from all bridges on the link, wherein the designated bridge is closest to the root bridge and will forward packets from the link to the root bridge;
   choosing a root port for each bridge that provides the best path to the root bridge;
   selecting ports on each bridge to be included in the spanning tree, wherein the selected ports include the root port and any ports coupled to links upon which the bridge serves as the designated bridge;
   placing selected ports into the forwarding state; and
   placing all other ports into the backup state.

8. A computer-readable storage medium storing instructions that when executed by a computer cause the computer to perform a method that prevents loops from occurring when spanning tree configuration messages are lost while executing a spanning tree protocol across bridges in a network, the method comprising:
   executing the spanning tree protocol on a bridge, wherein the spanning tree protocol configures each port coupled to the bridge into either a forwarding state, in which messages are forwarded to and from the port, or a backup state, in which messages are not forwarded to or from the port due to temporary network conditions; and
   monitoring ports coupled to the bridge to determine when messages are lost by the ports;
   if one or more messages are lost on a port, refraining from forwarding messages to or from the port until no messages are lost by the port for an amount of time;
   wherein refraining from forwarding messages to or from the port until no messages are lost for the amount of time prevents the spanning tree protocol from creating loops due to messages lost during the temporary network conditions.

9. The computer-readable storage medium of claim 8, wherein the amount of time is greater than a time interval provided by bridges between consecutive spanning tree configuration messages.

10. The computer-readable storage medium of claim 8, wherein monitoring ports coupled to the bridge involves communicating with hardware associated with the ports to determine if messages have been lost by the ports.

11. The computer-readable storage medium of claim 8, wherein executing the spanning tree protocol involves placing ports coupled to the bridge into either the forwarding state or the backup state in a manner that ensures that messages are forwarded without cycling across a spanning tree that couples together bridges in the network.

12. The computer-readable storage medium of claim 8, wherein the spanning tree protocol generally operates in accordance with Institute of Electrical and Electronics Engineers (IEEE) standard 802.1D.

13. The computer-readable storage medium of claim 8, wherein the links are Local Area Networks (LANs).

14. The computer-readable storage medium of claim 11, wherein executing the spanning tree protocol involves:
   electing a single bridge among all bridges on all links on the network to be a root bridge;
   calculating the distance of the shortest path from each node to the root bridge;
   electing a designated bridge for each link from all bridges on the link, wherein the designated bridge is closest to the root bridge and will forward packets from the link to the root bridge;
   choosing a root port for each bridge that provides the best path to the root bridge;
   selecting ports on each bridge to be included in the spanning tree, wherein the selected ports include the root port and any ports coupled to links upon which the bridge serves as the designated bridge;
   placing selected ports into the forwarding state; and
   placing all other ports into the backup state.

* * * * *